United States Patent [19]
Berta

[11] Patent Number: 5,959,030
[45] Date of Patent: Sep. 28, 1999

[54] DIRECTLY PAINTABLE THERMOPLASTIC OLEFIN COMPOSITION CONTAINING MALEIC ANHYDRIDE-MODIFIED POLYMERS

[75] Inventor: Dominic A. Berta, Newark, Del.

[73] Assignee: Montell North America Inc., Wilmington, Del.

[21] Appl. No.: 08/792,915

[22] Filed: Jan. 22, 1997

[51] Int. Cl.⁶ .......................... C08L 23/10; C08L 23/16; C08G 81/02
[52] U.S. Cl. ................. 525/64; 525/66; 525/71; 525/74; 525/78
[58] Field of Search ................. 525/64, 66, 71, 525/74, 78

[56] References Cited

U.S. PATENT DOCUMENTS 5,721,315  2/1998  Evans et al. ........................ 525/74
5,783,630  7/1998  Evans et al. ........................ 525/74

FOREIGN PATENT DOCUMENTS 429236   5/1991  European Pat. Off. .
634424   1/1995  European Pat. Off. .
662496   7/1995  European Pat. Off. .
98/02490 1/1998  WIPO .

*Primary Examiner*—Donald R. Wilson

[57] ABSTRACT

Directly paintable polymer compositions contain (1) a thermoplastic olefin, (2) a maleic anhydride-grafted propylene homopolymer or random copolymer, (3) a maleic anhydride-grafted olefin polymer material, (4) a functionalized polymer that reacts with the maleic anhydride groups of the grafted polymers, and, optionally, (5) a maleic anhydride-grafted ethylene polymer. The amount of (2)+(3) or (2)+(3)+(5) is at least 16 parts but less than 27 parts per hundred parts of the thermoplastic olefin.

4 Claims, No Drawings

DIRECTLY PAINTABLE THERMOPLASTIC OLEFIN COMPOSITION CONTAINING MALEIC ANHYDRIDE-MODIFIED POLYMERS

FIELD OF THE INVENTION

This invention relates to thermoplastic olefin compositions containing maleic anhydride-modified polymers and functionalized polymeric additives.

BACKGROUND OF THE INVENTION

Thermoplastic olefins (TPOs) are uncrosslinked blends of olefin polymers and polyolefin elastomers. They can be made by physically blending in an internal mixer, or by polymerizing in a reactor. These materials are not paintable or coatable, because the paints or coatings consist of polar materials like urethanes, acrylics, epoxies, or melamines that have very poor adhesion to nonpolar materials like polyolefins. Typically an adhesion promoter is used as the tie layer between the TPO substrate and the paint coating. This extra step adds to the cost of the product, and the coating is not very durable.

European Patent Application 662,496 discloses a paintable or printable polymer composition consisting of a polyolefin or polyolefin/rubber blend and 0.1 to 10% by weight of at least one polymeric additive that is the reaction product of (a) a polyolefin or polyester modified by an unsaturated acid, ester or anhydride, and (b) an amine-, hydroxy-, or alkoxy-terminated polyoxyethylene, polyoxypropylene, or a copolymer of the two, e.g., the reaction product of a maleic anhydride-modified polypropylene wax and a methoxy-capped poly(ethylene oxide) glycol.

European Patent Application 634,424 discloses a blend of polypropylene with the reaction product of maleated polypropylene and a polyether amine. The blend displays improved paintability, improved impact resistance, and excellent mold flowability compared to blends of polypropylene and the reaction product of polypropylene and maleated polypropylene. However, the compositions disclosed in EP 662,496 and EP 634,424 are both lacking in durability.

SUMMARY OF THE INVENTION

The composition of this invention comprises, by weight:
(1) 100 parts of a thermoplastic olefin comprising:
  (a) about 10% to about 60% of a propylene homopolymer having an isotactic index greater than 90, or a crystalline propylene copolymer with ethylene and/or a $C_{4-8}$ α-olefin having a propylene content greater than 85% and an isotactic index of greater than 85%;
  (b) about 30% to about 60% of an amorphous ethylene-propylene or ethylene-butene copolymer fraction, optionally containing about 1% to about 10% of a diene, which is xylene soluble at room temperature and contains about 30% to about 70% ethylene;
  (c) about 2% to about 20% of a semi-crystalline ethylene-propylene or ethylene-butene copolymer that is xylene insoluble at room temperature and contains greater than 75% but less than 92% ethylene; and
  (d) about 5% to about 20% of an ethylene polymer having a density of 0.91 to 0.96 g/cm$^3$ and a melt index of 0.1 to 100 g/10 min;
(2) about 8 parts to about 14 parts of a maleic anhydride-modified propylene homopolymer or ethylene/propylene random copolymer having a maleic anhydride content of about 2% to about 5% and a number average molecular weight $M_n$ of about 2500 to about 25,000, per hundred parts of the thermoplastic olefin;
(3) about 5 parts to about 14 parts per hundred parts of the thermoplastic olefin of a maleic anhydride-grafted olefin polymer material having a maleic anhydride content of at least 0.3% but less than 3%, selected from the group consisting of:
  (a) a maleic anhydride-grafted polyolefin rubber comprising an ethylene-propylene or ethylene-butene copolymer rubber, optionally containing about 0.5% to about 10% of a diene, which contains about 30% to about 70% ethylene, and
  (b) a maleic anhydride-grafted propylene polymer material, wherein the propylene polymer material consists essentially of:
    (i) about 10% to about 50% of a propylene homopolymer having an isotactic index of about 80% to about 99%, or a copolymer selected from the group consisting of (a) propylene and ethylene, (b) propylene, ethylene and a $CH_2\!=\!CHR$ α-olefin, where R is a $C_{2-8}$ straight or branched alkyl group, and (c) propylene and an α-olefin as defined above in (i)(b), the copolymer containing about 85% to about 99% propylene and having an isotactic index of about 80% to about 98%;
    (ii) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an α-olefin as defined above in (i)(b), containing about 1% to about 10% of the α-olefin and over 50% up to 98% of both ethylene and the α-olefin; and (c) ethylene and an α-olefin as defined in (i)(b), containing over 50% up to 98% of the α-olefin, which copolymer is insoluble in xylene at room or ambient temperature; and
    (iii) about 40% to about 80% of a copolymer fraction selected from the group consisting of a copolymer of (a) ethylene and propylene, wherein the copolymer contains from 20% to less than 40% ethylene; (b) ethylene, propylene, and an α-olefin as defined in (i)(b), wherein the α-olefin is present in an amount of about 1% to about 10%, and the amount of ethylene and α-olefin present is from 20% to less than 45%; and (c) ethylene and an α-olefin as defined in (i)(b), containing from 20% to less than 45% of the α-olefin, and optionally containing about 0.5% to about 10% of a diene, the copolymer fraction (iii) being soluble in xylene at ambient temperature, and having an intrinsic viscosity of about 1.7 to about 3.0 dl/g, wherein the total amount of fractions (ii) and (iii), based on the total olefin polymer composition is about 65% to about 80%, the weight ratio of fractions (ii)/(iii) is about 0.1 to about 0.3, and the total content of ethylene or $C_{4-8}$ α-olefin or combination thereof in fractions (ii)+(iii) is less than 50%;
(4) a functionalized polymer that reacts with the anhydride groups of (2), (3), and, if present, (5), selected from the group consisting of:
  (a) about 2.7 to about 6 parts of an amine-terminated polyalkylene glycol per hundred parts of the thermoplastic olefin;

(b) about 2 to about 6 parts per hundred parts of the thermoplastic olefin of a hydroxylated polymer selected from the group consisting of:
  (i) hydroxylated polyethylene,
  (ii) hydroxylated polybutene, and
  (iii) hydroxylated polybutadiene; and
(c) about 2 to about 6 parts of a mixture of (a)+(b) per hundred parts of the thermoplastic olefin, wherein the ratio of (a) to (b) is about 0.1 to about 0.9; and, optionally,
(5) about 4 parts to about 15 parts per hundred parts of the thermoplastic olefin of a maleic anhydride-grafted ethylene polymer having a maleic anhydride content of about 2% to about 13% and a number average molecular weight $M_n$ of about 500 to about 3000,
wherein (2)+(3), or (2)+(3)+(5) is at least 16 parts but less than 27 parts per hundred parts of the thermoplastic olefin, and when the maleic anhydride-grafted polyethylene is present, (3)+(5) is equal to or greater than 10 parts per hundred parts of the thermoplastic olefin.

Injection molded parts such as automobile bumpers made from this composition are directly paintable with polar paints or coatings without the need for a layer of adhesion promoter between the thermoplastic olefin surface and the paint.

DETAILED DESCRIPTION OF THE INVENTION

Component (1) of the composition of this invention is a thermoplastic olefin comprising, by weight, (a) about 10% to about 60%, preferably about 20% to about 50%, of a propylene homopolymer having an isotactic index greater than 90, preferably between 95 and 98, or a crystalline propylene copolymer with ethylene and/or a $C_{4-8}$ α-olefin having a propylene content greater than 85% and an isotactic index of greater than 85% wherein the isotactic index is defined as the percent insoluble in xylene at room temperature;

(b) about 30% to about 60%, preferably about 30% to about 50%, of an amorphous ethylene-propylene or ethylene-butene copolymer fraction, optionally containing about 1% to about 10% of a diene, which is xylene soluble at room temperature and contains about 30% to about 70% ethylene;

(c) about 2% to about 20%, preferably about 7% to about 15%, of a semi-crystalline ethylene-propylene or ethylene-butene copolymer that is xylene insoluble at room temperature and contains greater than 75% but less than 92% ethylene; and (d) about 5% to about 20%, preferably about 7% to about 15%, of an ethylene polymer having a density of 0.91 to 0.96 g/cm$^3$ and a melt index of 0.1 to 100 g/10 min, preferably about 15 to about 50 g/10 min. Ethylene homopolymer is preferred. However, copolymers containing 8% or less of an α-olefin comonomer can also be used.

The thermoplastic olefin is typically prepared by sequential polymerization in at least three stages. Fraction (a) can be made in the first reactor, fractions (b) and (c) in the second reactor, and fraction (d) in the third reactor. Alternatively, fraction (d) can be made in the second reactor and fractions (b) and (c) in the third reactor. The polymerization conditions and the polymerization catalyst are described in more detail in U.S. Pat. No. 5,302,454, which is incorporated herein by reference. Alternatively, the four fractions can be prepared separately and then blended together. Sequential polymerization is preferred.

The $C_{4-8}$ α-olefins useful in the preparation of the thermoplastic olefin include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

The thermoplastic olefin is present in an amount of 100 parts by weight.

Component (2) is a maleic anhydride-grafted propylene homopolymer or ethylene/propylene random copolymer having an ethylene content of about 0.5% to about 4%, preferably about 1% to about 3%. Propylene homopolymer is preferred. The polymer has a maleic anhydride content of about 2% to about 5%, preferably about 3% to about 4%, and preferably has a number average molecular weight $M_n$ of about 2500 to about 25,000, most preferably about 3000 to about 10,000. Component (2) is present in an amount of about 8 to about 14 parts, preferably about 10 to about 12 parts, per hundred parts of the thermoplastic olefin.

Component (3) is a maleic anhydride-grafted olefin polymer material selected from the group consisting of:

(a) a maleic anhydride-grafted polyolefin rubber comprising an ethylene/propylene or ethylene/butene copolymer rubber, optionally containing about 0.5% to about 10% of a diene, preferably about 2% to about 6%, which contains about 30% to about 70%, preferably about 40% to about 60%, ethylene, and (b) a maleic anhydride-grafted propylene polymer material, wherein the propylene polymer material consists essentially of:

(i) about 10% to about 50% of a propylene homopolymer having an isotactic index of about 80% to about 99%, or a copolymer selected from the group consisting of (a) propylene and ethylene, (b) propylene, ethylene and a $CH_2$=CHR α-olefin, where R is a $C_{2-8}$ straight or branched alkyl group, and (c) propylene and an α-olefin as defined above in (i)(b), the copolymer containing about 85% to about 99% propylene and having an isotactic index of about 80% to about 98% wherein the isotactic index is defined as the percent insoluble in xylene at room temperature;

(ii) about 3% to about 20% of a semi-crystalline, essentially linear copolymer fraction having a crystallinity of about 20% to about 60% by differential scanning calorimetry (DSC), wherein the copolymer is selected from the group consisting of (a) ethylene and propylene containing over 50% ethylene; (b) ethylene, propylene, and an α-olefin as defined above in (i)(b), containing about 1% to about 10% of the α-olefin and over 50% up to 98% of both ethylene and the α-olefin; and (c) ethylene and an α-olefin as defined in (i)(b), containing over 50% up to 98% of the α-olefin, which copolymer is insoluble in xylene at room or ambient temperature; and (iii) about 40% to about 80% of a copolymer fraction selected from the group consisting of a copolymer of (a) ethylene and propylene, wherein the copolymer contains from 20% to less than 40% ethylene; (b) ethylene, propylene, and an α-olefin as defined in (i)(b), wherein the α-olefin is present in an amount of about 1% to about 10%, and the amount of ethylene and α-olefin present is from 20% to less than 45%; and (c) ethylene and an α-olefin as defined in (i)(b), containing from 20% to less than 45% of the α-olefin, and optionally containing about 0.5% to about 10% of a diene, the copolymer fraction (iii) being soluble in xylene at ambient temperature, and having an intrinsic viscosity of about 1.7 to about 3.0 dl/g, wherein the total amount of fractions (ii) and (iii), based on the total olefin polymer composition is about 65% to about 80%, the weight ratio of fractions (ii)/(iii) is about 0.1 to about 0.3, and the total content of ethylene or $C_{4-8}$ α-olefin or combination thereof in fractions (ii)+(iii) is less than 50%.

Fraction (i) is preferably present in an amount of about 10% to about 40%, most preferably about 20% to about 35%. When (i) is a propylene homopolymer, the isotactic index is preferably about 85 to about 98. When (i) is a copolymer, the amount of propylene in the copolymer is preferably about 90% to about 99%.

Fraction (ii) is preferably present in an amount of about 7% to about 15%. Typically the crystallinity is about 20% to about 60% by DSC. Generally, the ethylene or α-olefin content or the combination of ethylene and the α-olefin when both are used is over 55% up to 98%, preferably about 80% to about 95%.

Fraction (iii) is preferably present in an amount of about 50% to about 70%. The ethylene or the α-olefin content or ethylene and the α-olefin content of component (iii) is preferably about 20% to about 38%, most preferably about 25% to about 38%.

Component (3)(a) can be made with a Ziegler-Natta catalyst, a metallocene catalyst, or a mixed catalyst, and can be amorphous or contain from about 1% to about 10% crystallinity as measured by DSC.

Component (3)(b) has at least one melt peak, determined by DSC, present at temperatures higher than 120° C., and at least one peak, relative to the vitreous transition, present at temperatures from −10° C. and −35° C. In addition, these materials have a flexural modulus of less than 150 MPa, generally 20 to 100 MPa; a tensile strength at yield of 10 to 20 MPa; elongation at break over 400%; a tension set, at 75% strain, of 20% to 50%; a Shore D hardness of 20 to 35; a haze value of less than 40%, preferably less than 35%, and does not break (no brittle impact failure) when an Izod impact test is conducted at −50° C.

Suitable α-olefins of the formula $CH_2$=CHR include, for example, butene-1; pentene-1; 4-methylpentene-1; hexene-1, and octene-1.

When a diene is present in Component (3)(a), it is typically 1,4-hexadiene, ethylidenenorbornene, or dicyclopentadiene. When a diene is present in Component (3)(b), it is typically a butadiene; 1,4-hexadiene; 1,5-hexadiene; or ethylidenenorbornene.

Component 3(b) can be prepared by a polymerization process comprising at least two stages, where in the first stage the propylene, or propylene and ethylene or the α-olefin, or propylene, ethylene and the α-olefin are polymerized to form component (i), and in the following stages the mixtures of ethylene and propylene or α-olefin, or propylene, ethylene and α-olefin, and optionally a diene, are polymerized to form components (ii) and (iii).

The polymerization can be conducted in the liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in the gas phase, without intermediate stages except for the partial degassing of the propylene. The preparation of the propylene polymer material is described in more detail in U.S. Pat. No. 5,212,246, which is incorporated herein by reference.

The olefin polymer material (3) is present in an amount of about 5 to about 14 parts, preferably about 8 to about 12 parts, per hundred parts of the thermoplastic olefin. The olefin polymer material has a maleic anhydride content of at least 0.3%, but less than 3%, preferably less than 1%, and most preferably less than 0.8%. Levels of maleic anhydride equal to or greater than 3% give gels, poor adhesion, and poor durability.

Component (4) is a functionalized polymer that can react with the maleic anhydride groups in components (2), (3), and, if present, (5) selected from the group consisting of (a) an amine-terminated polyalkylene glycol such as polyethylene glycol, polypropylene glycol, copolymers of polyethylene glycol and polypropylene glycol, poly(1,2-butylene glycol), and poly(tetramethylene glycol), and (b) a hydroxylated polymer selected from the group consisting of (i) hydroxylated polyethylene, (ii) hydroxylated polybutene, and (iii) hydroxylated polybutadiene. Amine-terminated polyethylene oxide is preferred.

Component (4)(a), when present, is used in an amount of about 2.7 to about 6 parts, preferably about 2.8 to about 4 parts, per hundred parts of the thermoplastic olefin, and Component (4)(b), when present, is used in an amount of about 2 to about 6 parts, preferably about 3 to about 5 parts, per hundred parts of the thermoplastic olefin. A mixture of (a)+(b) can also be used in an amount of about 2 to about 6 parts per hundred parts of the thermoplastic olefin, where the ratio of (a) to (b) is about 0.1 to about 0.9.

Optional component (5) is a maleic anhydride-grafted ethylene polymer having a maleic anhydride content of about 2% to about 13%, preferably about 3% to about 6%. Ethylene homopolymer is preferred. However, copolymers containing 10% or less of an α-olefin comonomer can also be used. The ethylene polymer preferably has a number average molecular weight $M_n$ of about 500 to about 3000, most preferably about 650 to about 2500; a melting point of about 90° C. to about 129° C., most preferably about 92° to about 126° C., and a viscosity of about 20 to about 1000, most preferably about 100 to about 500, SUS at 149° C. (ASTM D-88). When component (5) is used, it is present in an amount of about 4 to about 15 parts, preferably about 5 to about 10 parts, per hundred parts of the thermoplastic olefin, and the amount of (3)+(5) is equal to or greater than 10 parts per hundred parts of the thermoplastic olefin.

The total amount of (2)+(3), or (2)+(3)+(5) is at least 16 parts but less than 27 parts, preferably about 18 to about 22 parts, per hundred parts of the thermoplastic olefin.

If non-polymeric additives such as conductive carbon black are used, they should be added after the functionalized polymer has reacted with the maleic anhydride-grafted polymers. Alternatively, an adduct of the functionalized polymer and maleic anhydride-grafted polyolefin can be prepared separately, then blended with the thermoplastic olefin.

The composition of the present invention can also contain other conventional additives, for example, antioxidants; stabilizers; extender oils such as paraffinic and naphthenic oils; filers such as $CaCO_3$, talc, and zinc oxide, or flame retardants.

The compounding or melt blending of the components of the composition can be carried out on an open roll, in an internal mixer (Banbury or Haake mixers), and single-screw or twin-screw extruders.

Optionally the maleic anhydride-grafted polymers can be preblended, or they can be prereacted with component (4) prior to blending with the thermoplastic olefin. The former method is preferred, however.

In the following examples and comparative examples, the samples for testing were prepared by dry blending the ingredients and reactive mixing in a twin screw extruder at a temperature of 450° F. and pelletizing the resultant material. The pellets were injection molded into disks that were painted with about a 1.2 to 2 mil thick coating using Du Pont 872 white paint and cured at 250° F. for thirty minutes. A lattice pattern of squares with each square about ¼ inch in size was scribed on the painted disk at the end opposite the gate area of the disk. Adhesive tape (3 M 898) was pressed onto the paint and pulled off to test the amount of paint removed or the paint adhesion. The % failure was recorded as the % of the squares removed by the tape after one pull. The durability was determined by using a Taber abrader with a type C scuffing head assembly and a one pound load. The painted disk was placed in an oven at 70° C. for one hour, removed and placed on the platform of the abrader. The scuffing head was placed in contact with the painted surface and the disk was rotated for a specified number of cycles. The amount of paint removed from the complete circumference subtended by the scuffing head was recorded as the % failure.

The criteria set for acceptable paint adhesion was less than 10% failure (paint removed) by the adhesive tape and less than 20% of the paint removed by the Taber abrader after 25 cycles and 30% or less removed after 50 cycles.

In this specification all parts and percentages are by weight unless otherwise noted.

EXAMPLES 1–7

Examples 1–7 show the paint adhesion and durability of compositions containing a thermoplastic olefin (TPO), various amounts of maleic anhydride-grafted olefin polymer material (MA-g-OPM), maleic anhydride-grafted polypropylene (MA-g-PP), and amine-terminated polyethylene oxide (ATPEO), with and without maleic anhydride-grafted polyethylene (MA-g-PE). The results are shown in Table 1.

In the table, the thermoplastic olefin contains 55% propylene homopolymer, 3% semi-crystalline ethylene/propylene copolymer that has a propylene content of ~10% and is insoluble in xylene at room temperature, 30% amorphous ethylene/propylene copolymer rubber that has an ethylene content of 50% and is soluble in xylene at room temperature, and 12% ethylene homopolymer having a melt index of about 50 g/10 min.

The MA-grafted OPM (1) was Exxelor VA-1803 ethylene/propylene rubber containing 0.7% grafted maleic anhydride, commercially available from Exxon Chemical Company.

The MA-grafted OPM (2) was Royaltuf 465A ethylene/propylene/non-conjugated diene terpolymer rubber containing 0.4% grafted maleic anhydride, having a Mooney viscosity (ML 1+4 @ 125° C.) of 60 and an ethylene/propylene ratio of 75/25, commercially available from Uniroyal Chemical Co. Inc.

The MA-grafted polypropylene was Epolene E-43 maleic anhydride-modified polypropylene wax, commercially available from Eastman Chemical Company.

The MA-grafted polyethylene was Ceramer 67 maleic anhydride-grafted polyethylene wax, commercially available from Petrolite Corporation.

The ATPEO was XTJ-418 monoamine-terminated polyethylene oxide, commercially available from Huntsman Corporation.

The antioxidant was Irganox B 225, a blend of 1 part Irganox 1010 2,2-bis[[3-(3,5-bis( 1,1-dimethylethyl)-4-hydroxyphenyl]-1-oxopropoxy)methyl]-1,3-propanediyl-3, 5-bis(1,1-dimethylethyl)-4-hydroxybenzene propanoate stabilizer and 1 part Irgafos 168 tris(2,4-di-t-butylphenyl) phosphite, commercially available from Ciba-Geigy.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| TPO | 100 | 100 | 100 | 100 | 100 | 100 | 100 |
| MA-g-OPM (1) | 5 | 5 | 10 | 10 | 5 | 10 | 10 |
| MA-g-OPM (2) | 5 | 5 | — | — | — | — | — |
| MA-g-PP | 10 | 10 | 10 | 10 | 10 | 10 | 10 |
| MA-g-PE | — | 5 | — | — | 10 | — | — |
| ATPEO | 3 | 3 | 3 | 4 | 3 | 3 | 4 |
| Antioxidant | 0.2 | 0.2 | 0.2 | 0.2 | 0.2 | 0.2 | 0.2 |
| Paint Adhesion, % Failure | 3 | 0 | 6 | 0 | 0 | 9 | 0 |
| Durability, % Failure |  |  |  |  |  |  |  |
| 25 Cycles | 10 | 0 | 8 | 15 | 0 | 15 | 15 |
| 50 Cycles | 20 | 0 | 8 | 20 | 12 | 15 | 25 |

Examples 1, 3, 4, 6 and 7 show that the combination of MA-grafted polypropylene and MA-grafted ethylene/propylene olefin polymer material gave both good adhesion and durability. Examples 2 and 5 show that combining MA-grafted polyethylene with the MA-grafted polypropylene and MA-grafted olefin polymer material gave a slight improvement in paint adhesion and an improvement in durability.

COMPARATIVE EXAMPLES 1–4

In Table 2, the ungrafted rubber used in Comparative Example 1 was Dutral 4038 ethylene/propylene/ethylidenenorbornene terpolymer rubber containing 4% ethylidenenorbornene, commercially available from Enichem America Inc. All of the other components of the formulations were the same as in Examples 1–7.

TABLE 2

|  | Comp. Ex. 1 | Comp. Ex. 2 | Comp. Ex. 3 | Comp. Ex. 4 |
| --- | --- | --- | --- | --- |
| TPO | 100 | 100 | 100 | 100 |
| Rubber | 10 | — | — | — |
| MA-g-OPM (1) | — | — | 5 | — |
| MA-g-OPM (2) | — | — | 5 | — |
| MA-g-PP | 10 | 20 | 5 | 10 |
| MA-g-PE | — | — | 10 | 10 |
| ATPEO | 4 | 4 | 3 | 3 |
| Antioxidant | 0.2 | 0.2 | 0.2 | 0.2 |
| Paint Adhesion, % Failure | 45 | 0 | 54 | 28 |
| Durability, % Failure |  |  |  |  |
| 25 Cycles | 28 | 45 | 28 | 0 |
| 50 Cycles | 44 | 55 | 50 | 1 |

Comparative Example 1 showed that adding rubber that is not grafted with maleic anhydride gave both poor adhesion and poor durability. Comparative Example 2 showed that adding higher levels of MA-grafted polypropylene but no MA-grafted OPM gave good adhesion, but durability was still poor. Comparative Example 3 showed that low levels of MA-grafted polypropylene (5 parts) in combination with a MA-grafted OPM gave both poor adhesion and poor durability. Comparative Example 4 showed that combining MA-grafted polypropylene and MA-grafted polyethylene without MA-grafted olefin polymer material gave good durability, but poor paint adhesion.

EXAMPLES 8–11

Examples 8–11 show the paint adhesion and durability of compositions containing a thermoplastic olefin (TPO), maleic anhydride-grafted olefin polymer materials (MA-g-OPM), maleic anhydride-grafted polypropylene (MA-g-PP), and three types of functionalized polymers, i.e., amine-terminated polyethylene oxide (ATPEO), hydroxylated polyethylene (HPE), and hydroxylated polybutene (HPB). The results are given in Table 3.

In Table 3, the thermoplastic elastomer, the maleic anhydride-grafted olefin polymer materials (1) and (2), the maleic anhydride-grafted polypropylene, the amine-terminated polyethylene oxide, and the antioxidant are the same as in Examples 1–7.

The maleic anhydride-grafted OPM (3) was a propylene polymer material comprising (a) 30% of a propylene/ethylene random copolymer having an ethylene content of 3.3%, (b) 6.8% of a semi-crystalline ethylene/propylene copolymer fraction that is insoluble in xylene at room temperature, and (c) 63.2% of an amorphous ethylene/propylene copolymer fraction that is soluble in xylene at room temperature, and contained 1% grafted maleic anhydride.

The MA-g-PE was Ceramer 67 maleic anhydride-grafted polyethylene wax, commercially available from Petrolite Corporation.

The HPE was Unilin 350 hydroxylated polyethylene wax, commercially available form Petrolite Corporation.

The HPB was HPVM 2202 hydroxylated polybutene, commercially available from Shell Chemical Company.

TABLE 3

|  | Ex. 8 | Ex. 9 | Ex. 10 | Ex. 11 |
| --- | --- | --- | --- | --- |
| TPO | 100 | 100 | 100 | 100 |
| MA-g-OPM (1) | — | — | — | 5 |
| MA-g-OPM (2) | — | 10 | 10 | — |
| MA-g-OPM (3) | 10 | — | — | — |
| MA-g-PP | 10 | 10 | 10 | 10 |
| MA-g-PE | — | — | — | 10 |
| ATPEO | 3 | — | — | — |
| HPE | — | 6 | — | — |
| HPB | — | — | 3 | 3 |
| Antioxidant | 0.2 | 0.2 | 0.2 | 0.2 |
| Paint Adhesion, % Failure | 0 | 0 | 0 | 0 |
| Durability, % Failure |  |  |  |  |
| 25 Cycles | 0 | 18 | 13 | 0 |
| 50 Cycles | 0 | 26 | 18 | 0 |

COMPARATIVE EXAMPLES 5–9

In Table 4, the thermoplastic olefin, maleic anhydride-grafted olefin polymer materials (1) and (3), the maleic anhydride-grafted polypropylene, the amine-terminated polyethylene oxide, and the antioxidant were the same as in Examples 8–13. The maleic anhydride-grafted OPM (4) was the same as maleic anhydride-grafted OPM (3), except that it contained 3% grafted maleic anhydride instead of 1%.

TABLE 4

|  | Comp. Ex. 5 | Comp. Ex. 6 | Comp. Ex. 7 | Comp. Ex. 8 | Comp. Ex. 9 |
| --- | --- | --- | --- | --- | --- |
| TPO | 100 | 100 | 100 | 100 | 100 |
| MA-g-OPM (1) | — | 10 | 10 | — | — |
| MA-g-OPM (3) | — | — | — | 10 | — |
| MA-g-OPM (4) | 10 | — | — | — | 10 |
| MA-g-PP | 10 | 10 | 10 | — | — |
| ATPEO | 3 | 2.5 | 7 | 3 | 3 |
| Antioxidant | 0.2 | 0.2 | 0.2 | 0.2 | 0.2 |
| Paint Adhesion, % Failure | 30 | 18 | 30 | 100 | 100 |
| Durability, % Failure |  |  |  |  |  |
| 25 Cycles | 45 | 35 | 50 | 100 | 100 |
| 50 Cycles | 55 | 38 | 75 | 100 | 100 |

These comparative examples show that both adhesion and durability are unacceptable when the MA-g-OPM contains 3% or more grafted maleic anhydride (Comp. Ex. 5 and 9), too much or too little ATPEO is used (Comp. Ex. 6 and 7), and when MA-g-PP is not included in the composition (Comp. Ex. 8 and 9).

EXAMPLES 12 and 13

These examples illustrate the use of a mixture of an amine-terminated polyalkylene glycol and a hydroxylated polymer as the functionalized polymer, component (4) of the composition of this invention. The results are shown in Table 5.

In Table 5, the thermoplastic olefin, the maleic anhydride-grafted polypropylene, the maleic anhydride-grafted olefin polymer materials (1) and (2), the ATPEO, and the antioxidant are the same as those used in Examples 1–7. The HPE and HPB are the same as those used in Examples 8–11.

TABLE 5

|  | Ex. 12 | Ex. 13 |
| --- | --- | --- |
| TPO | 100 | 100 |
| MA-g-OPM (1) | 5 | 5 |
| MA-g-OPM (2) | 5 | 5 |
| MA-g-PP | 10 | 10 |
| ATPEO | 3 | 3 |
| HPE | 3 | — |
| HPB | — | 1 |
| Antioxidant | 0.2 | 0.2 |
| Paint Adhesion, % Failure | 0 | 0 |
| Durability, % Failure |  |  |
| 25 cycles | 8 | 16 |
| 50 cycles | 50 | 28 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

I claim:

1. A composition comprising, wherein all parts and percentages are by weight, (1) 100 parts of a thermoplastic olefin comprising:
  (a) about 10% to about 60% of a propylene homopolymer having an isotactic index, defined as the percent insoluble in xylene at room temperature, greater than 90, or a crystalline propylene copolymer with ethylene and/or a $C_{4-8}$ α-olefin having a polymerized propylene content greater than 85% and an isotactic index, defined as the percent insoluble in xylene at room temperature, of greater than 85%;
  (b) about 30% to about 60% of an amorphous ethylene-propylene or ethylene-butene copolymer, optionally containing about 1% to about 10% of a polymerized diene, which is xylene soluble at room temperature and contains about 30% to about 70% polymerized ethylene;
  (c) about 2% to about 20% of a semi-crystalline ethylene-propylene or ethylene-butene copolymer that is xylene insoluble at room temperature and contains greater than 75% but less than 92% polymerized ethylene; and
  (d) about 5% to about 20% of an ethylene polymer having a density of 0.91 to 0.96 g/cm$^3$ and a melt index of 0.1 to about 100 g/10 min, the ethylene polymer being selected from the group consisting of (i) an ethylene homopolymer and (ii) a copolymer of ethylene and an α-olefin containing 8% or less of polymerized α-olefin;
(2) about 8 parts to about 14 parts per hundred parts of the thermoplastic olefin of a maleic anhydride-grafted propylene homopolymer or ethylene/propylene random copolymer having a polymerized ethylene content of about 0.5% to about 4%, the homopolymer and copolymer having a maleic anhydride content of about 2 to about 5% and a number average molecular weight $M_n$ of about 2500 to about 25,000;
(3) about 5 parts to about 14 parts per hundred parts of the thermoplastic olefin of a maleic anhydride-grafted olefin polymer material having a maleic anhydride content of at least 0.3% but less than 3%, selected from the group consisting of:
  (a) a maleic anhydride-grafted polyolefin rubber comprising an ethylene/propylene or ethylene/butene copolymer rubber, optionally containing about 0.5% to about 10% of a polymerized diene, which contains about 30% to about 70% polymerized ethylene, and
  (b) a maleic anhydride-grafted propylene polymer material, wherein the propylene polymer material consists essentially of:
    (i) about 10% to about 50% of a propylene homopolymer having an isotactic index, defined as the percent insoluble in xylene at room temperature, of about 80% to about 99%, or a copolymer from monomers selected from the group consisting of (a) propylene and ethylene, (b) propylene, ethylene and a $CH_2$=CHR α-olefin, where R is a $C_{2-8}$ straight or branched alkyl group, and (c) propylene and an α-olefin as defined above in (i)(b), the copolymer containing about 85% to about 99% polymerized propylene and having an isotactic index, defined as the percent insoluble in xylene at room temperature, of about 80% to about 98%;
    (ii) about 3% to about 20% of a semi-crystalline, essentially linear copolymer having a crystallinity of about 20% to about 60% by differential scanning calorimetry (DSC), wherein the copolymer is from monomers selected from the group consisting of (a) ethylene and propylene containing over 50% polymerized ethylene; (b) ethylene, propylene, and an α-olefin as defined above in (i)(b), containing about 1% to about 10% of the polymerized α-olefin and over 50% up to 98% of both polymerized ethylene and polymerized α-olefin; and (c) ethylene and an α-olefin as defined in (i)(b), containing over 50% up to 98% of the polymerized α-olefin, which copolymer is insoluble in xylene at room or ambient temperature; and
    (iii) about 40% to about 80% of a copolymer from monomers selected from the group consisting of (a) ethylene and propylene, wherein the copolymer contains from 20% to less than 40% polymerized ethylene; (b) ethylene, propylene, and an α-olefin as defined in (i)(b), wherein the polymerized α-olefin is present in an amount of about 1% to about 10%, and the amount of polymerized ethylene and polymerized α-olefin present is from 20% to less than 45%; and (c) ethylene and an α-olefin as defined in (i)(b), containing from 20% to less than 45% of the polymerized α-olefin, and optionally containing about 0.5% to about 10% of a polymerized diene, the copolymer (iii) being soluble in xylene at ambient temperature, and having an intrinsic viscosity of about 1.7 to about 3.0 dl/g, wherein the total amount of (ii) and (iii), based on the total olefin polymer composition is about 65% to about 80%, the weight ratio of (ii)/(iii) is about 0.1 to about 0.3, and the total content of polymerized ethylene or polymerized $C_{4-8}$ α-olefin or combination thereof in (ii)+(iii) is less than 50%; and
(4) a functionalized polymer that is reactive with the anhydride groups of the grafted polymers, selected from the group consisting of:
  (a) about 2.7 to about 6 parts of an amine-terminated polyalkylene glycol per hundred parts of thermoplastic olefin;
  (b) about 2 to about 6 parts per hundred parts of the thermoplastic olefin of a hydroxylated polymer selected from the group consisting of:
    (i) hydroxylated polyethylene,
    (ii) hydroxylated polybutene, and
    (iii) hydroxylated polybutadiene; and
  (c) about 2 to about 6 parts per hundred parts of the thermoplastic olefin of a mixture of (a)+(b), where the ratio of (a) to (b) is about 0.1 to about 0.9,
wherein (2)+(3) is at least 16 parts but less than 27 parts per hundred parts of the thermoplastic olefin.

2. The composition of claim 1, wherein (4) is an amine-terminated polyalkylene glycol.

3. The composition of claim 1, wherein (4) is a mixture of (a) and (b), the total amount of (a)+(b) is about 2 to about 6 parts per hundred parts of the thermoplastic olefin, and the ratio of (a) to (b) is about 0.1 to about 0.9.

4. An injection molded article comprising the composition of claim 1.

* * * * *